United States Patent
Lee et al.

(10) Patent No.: US 10,298,824 B2
(45) Date of Patent: May 21, 2019

(54) COLOR SENSOR MODULE AND MOBILE TERMINAL

(71) Applicant: LG ELECTRONICS INC., Seoul (KR)

(72) Inventors: Dongjin Lee, Seoul (KR); Jongpil Kim, Seoul (KR); Sungbum Joo, Seoul (KR); Hakhae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 15/566,086

(22) PCT Filed: Mar. 21, 2016

(86) PCT No.: PCT/KR2016/002807
§ 371 (c)(1),
(2) Date: Oct. 12, 2017

(87) PCT Pub. No.: WO2016/167483
PCT Pub. Date: Oct. 20, 2016

(65) Prior Publication Data
US 2018/0091712 A1    Mar. 29, 2018

(30) Foreign Application Priority Data

Apr. 13, 2015  (KR) .................. 10-2015-0051610

(51) Int. Cl.
*H04N 5/225*  (2006.01)
*H04N 9/07*  (2006.01)
(Continued)

(52) U.S. Cl.
CPC .......... *H04N 5/2257* (2013.01); *G01J 3/0208* (2013.01); *G01J 3/0272* (2013.01); *G01J 3/50* (2013.01); *G02B 19/0014* (2013.01); *G02B 19/0076* (2013.01); *H04M 1/026* (2013.01); *H04N 5/2253* (2013.01); *H04N 5/2256* (2013.01); *H04N 5/33* (2013.01); *H04N 9/045* (2013.01); *H04N 9/07* (2013.01);
(Continued)

(58) Field of Classification Search
None
See application file for complete search history.

(56) References Cited

U.S. PATENT DOCUMENTS

| | | | | |
|---|---|---|---|---|
| 5,400,072 A | * | 3/1995 | Izumi | ................ G02B 9/12 |
| | | | | 348/335 |
| 7,177,161 B2 | * | 2/2007 | Shima | ................ H04B 15/00 |
| | | | | 174/350 |

(Continued)

FOREIGN PATENT DOCUMENTS

| | | |
|---|---|---|
| JP | 7-110264 A | 4/1995 |
| JP | 2010-11209 A | 1/2010 |

(Continued)

*Primary Examiner* — Twyler L Haskins
*Assistant Examiner* — Dwight Alex C Tejano
(74) *Attorney, Agent, or Firm* — Birch, Stewart, Kolasch & Birch, LLP (57) ABSTRACT

A color sensor module including a color sensor for detecting a surrounding color condition, and a concave lens located in front of the color sensor can ensure an amount of light reaching the color sensor, thereby obtaining more accurate color condition information, regardless of the incident angle.

15 Claims, 9 Drawing Sheets

(51) Int. Cl.
*H04M 1/02* (2006.01)
*H04N 5/33* (2006.01)
*H04N 9/04* (2006.01)
*G01J 3/50* (2006.01)
*G01J 3/02* (2006.01)
*G02B 19/00* (2006.01)
*G02B 1/11* (2015.01)
*G02B 3/00* (2006.01)
*H04N 1/60* (2006.01)

(52) U.S. Cl.
CPC .............. *G02B 1/11* (2013.01); *G02B 3/0006* (2013.01); *G02B 2003/0093* (2013.01); *H04M 1/0202* (2013.01); *H04M 2250/12* (2013.01); *H04N 1/6008* (2013.01)

(56) References Cited

U.S. PATENT DOCUMENTS

| | | | | | |
|---|---|---|---|---|---|
| 2004/0227838 | A1* | 11/2004 | Atarashi | ................ | G02B 3/14 348/340 |
| 2008/0055748 | A1* | 3/2008 | Konno | ............... | A61B 1/00096 359/819 |
| 2009/0161005 | A1* | 6/2009 | Cheng | ................ | H04N 5/2256 348/373 |
| 2010/0157141 | A1* | 6/2010 | Ouyang | .............. | H04N 5/2251 348/371 |
| 2010/0245653 | A1* | 9/2010 | Bodor | ................ | G02B 23/243 348/335 |
| 2010/0309369 | A1* | 12/2010 | Jarvis | ................... | H04N 5/2254 348/371 |
| 2011/0255000 | A1* | 10/2011 | Weber | .................... | G03B 17/02 348/374 |
| 2012/0019920 | A1* | 1/2012 | Mongan | ................. | G02B 6/0035 359/601 |
| 2013/0314582 | A1* | 11/2013 | Masser | ................ | H04N 5/2254 348/340 |
| 2014/0022451 | A1* | 1/2014 | Wang | .................. | H04N 5/2256 348/375 |
| 2014/0219646 | A1* | 8/2014 | Hooton | .................. | G03B 15/03 396/176 |

FOREIGN PATENT DOCUMENTS

| | | |
|---|---|---|
| KR | 10-2003-0037295 A | 5/2003 |
| KR | 10-2009-0126141 A | 12/2009 |
| KR | 10-2010-0067882 A | 3/2013 |
| KR | 10-2013-0025653 A | 3/2013 |

* cited by examiner

| Lens center thickness: 0.5mm | | Angle of incidence | Radius of curvature | | | | |
|---|---|---|---|---|---|---|---|
| | | | 1mm | 1.5mm | 2mm | 2.5mm | 3mm |
| Distance | 0.5mm | 0° | 0.34 | 0.41 | 0.45 | 0.48 | 0.50 |
| | | 25° | 0.30 | 0.36 | 0.39 | 0.42 | 0.43 |
| | | 50° | 0.21 | 0.24 | 0.25 | 0.27 | 0.28 |
| | | Uniformity | 61.72% | 58.02% | 56.59% | 55.87% | 55.67% |
| | | Total | 0.85 | 1.00 | 1.10 | 1.16 | 1.21 |
| | 0.75mm | 0° | 0.28 | 0.36 | 0.40 | 0.44 | 0.46 |
| | | 25° | 0.26 | 0.32 | 0.36 | 0.38 | 0.40 |
| | | 50° | 0.19 | 0.22 | 0.23 | 0.25 | 0.26 |
| | | Uniformity | 65.27% | 60.41% | 57.85% | 56.64% | 55.86% |
| | | Total | 0.73 | 0.89 | 1.00 | 1.07 | 1.12 |
| | 1mm | 0° | 0.24 | 0.32 | 0.37 | 0.40 | 0.43 |
| | | 25° | 0.22 | 0.28 | 0.33 | 0.35 | 0.38 |
| | | 50° | 0.16 | 0.20 | 0.22 | 0.23 | 0.24 |
| | | Uniformity | 68.08% | 62.69% | 59.61% | 57.65% | 56.54% |
| | | Total | 0.63 | 0.80 | 0.91 | 0.99 | 1.05 |
| | 1.25mm | 0° | 0.21 | 0.28 | 0.33 | 0.37 | 0.40 |
| | | 25° | 0.19 | 0.26 | 0.30 | 0.33 | 0.35 |
| | | 50° | 0.14 | 0.18 | 0.20 | 0.22 | 0.23 |
| | | Uniformity | 69.67% | 64.63% | 61.26% | 59.18% | 57.47% |
| | | Total | 0.55 | 0.72 | 0.84 | 0.92 | 0.99 |
| | 1.5mm | 0° | 0.18 | 0.25 | 0.31 | 0.35 | 0.38 |
| | | 25° | 0.17 | 0.23 | 0.28 | 0.31 | 0.33 |
| | | 50° | 0.13 | 0.17 | 0.19 | 0.21 | 0.22 |
| | | Uniformity | 70.09% | 66.69% | 62.83% | 59.93% | 58.56% |
| | | Total | 0.48 | 0.65 | 0.77 | 0.86 | 0.93 |
| Required minimum diameter of lens shape | | | 1.75mm | 2mm | 2.25mm | 2.5mm | 2.75mm |
| Required minimum area of cover glass | | | 3.75mm x 3.75mm | | | | |

FIG. 9

| Lens center thickness : 0.75mm | | Angle of incidence | Radius of curvature | | | | |
|---|---|---|---|---|---|---|---|
| | | | 1mm | 1.5mm | 2mm | 2.5mm | 3mm |
| Distance | 0.5mm | 0° | 0.34 | 0.41 | 0.45 | 0.48 | 0.50 |
| | | 25° | 0.30 | 0.36 | 0.39 | 0.42 | 0.43 |
| | | 50° | 0.21 | 0.24 | 0.25 | 0.27 | 0.28 |
| | | Uniformity | 61.74% | 58.17% | 56.50% | 55.95% | 55.64% |
| | | Total | 0.85 | 1.00 | 1.10 | 1.16 | 1.21 |
| | 0.75mm | 0° | 0.28 | 0.36 | 0.40 | 0.44 | 0.46 |
| | | 25° | 0.26 | 0.32 | 0.36 | 0.38 | 0.40 |
| | | 50° | 0.19 | 0.22 | 0.23 | 0.25 | 0.26 |
| | | Uniformity | 65.27% | 60.29% | 57.74% | 56.71% | 55.81% |
| | | Total | 0.73 | 0.89 | 0.99 | 1.07 | 1.12 |
| | 1mm | 0° | 0.24 | 0.32 | 0.37 | 0.40 | 0.43 |
| | | 25° | 0.22 | 0.28 | 0.33 | 0.35 | 0.38 |
| | | 50° | 0.16 | 0.20 | 0.22 | 0.23 | 0.24 |
| | | Uniformity | 67.34% | 62.52% | 59.44% | 57.54% | 56.64% |
| | | Total | 0.63 | 0.80 | 0.91 | 0.99 | 1.05 |
| | 1.25mm | 0° | 0.21 | 0.28 | 0.33 | 0.37 | 0.40 |
| | | 25° | 0.19 | 0.26 | 0.30 | 0.33 | 0.35 |
| | | 50° | 0.14 | 0.18 | 0.20 | 0.22 | 0.23 |
| | | Uniformity | 69.49% | 64.68% | 61.03% | 59.11% | 57.53% |
| | | Total | 0.54 | 0.72 | 0.84 | 0.92 | 0.99 |
| | 1.5mm | 0° | 0.18 | 0.25 | 0.31 | 0.35 | 0.38 |
| | | 25° | 0.17 | 0.23 | 0.28 | 0.31 | 0.33 |
| | | 50° | 0.13 | 0.17 | 0.19 | 0.21 | 0.22 |
| | | Uniformity | 70.13% | 66.87% | 62.89% | 60.36% | 58.86% |
| | | Total | 0.48 | 0.65 | 0.77 | 0.86 | 0.93 |
| Required minimum diameter of lens shape | | | 1.75mm | 2mm | 2.25mm | 2.5mm | 2.75mm |
| Required minimum area of cover glass | | | 4.25mm x 4.25mm | | | | |

COLOR SENSOR MODULE AND MOBILE TERMINAL

CROSS-REFERENCE TO RELATED APPLICATIONS

This application is the National Phase of PCT International Application No. PCT/KR2016/002807, filed on Mar. 21, 2016, which claims priority under 35 U.S.C. 119(a) to Patent Application No. 10-2015-0051610, filed in Republic of Korea on Apr. 13, 2015, all of which are hereby expressly incorporated by reference into the present application.

BACKGROUND OF THE INVENTION

Field of the Invention

The present invention relates to a color sensor module including a color sensor capable of obtaining information regarding accurate color conditions regardless of the angle of incidence of light and a mobile terminal having the same.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

With an increase in the variety of multimedia functions, the performance of a camera has greatly improved, and the camera may obtain an image having a quality almost as good as that of a dedicated camera. A camera having excellent specifications may be provided by using technology for miniaturizing a camera module, and color correction, shake correction, or the like may be possible using an illumination sensor, a gyro-sensor or the like provided in the mobile terminal.

However, because a camera has a limitation in that it cannot perceive the color in the same way as the human eye, it is necessary to adjust white balance. Technology for allowing a camera to automatically obtain an image with a color similar to an actual color, rather than being manually set by a user, is being studied.

SUMMARY OF THE INVENTION

An object of the present invention is to provide a color sensor module including a color sensor capable of obtaining information regarding accurate color conditions regardless of the angle of incidence of light and a mobile terminal having the same.

To achieve the object described above or any other object, in accordance with one aspect of the present invention, there is provided a color sensor module including a color sensor configured to sense a surrounding color condition, and a concave lens located on a front side of the color sensor.

The concave lens may have a radius of curvature ranging from 1 mm or more to 5 mm or less.

The concave lens in which a ratio of an amount of light when light introduced into the concave lens at an angle of incidence of 50 degrees reaches the color sensor to an amount of light when light introduced into the concave lens at an angle of incidence of 0 degrees reaches the color sensor is 58% or more may be used.

The concave lens may include a first surface that faces the color sensor and is a concave surface and a second surface that is opposite the first surface and is a flat surface.

The color sensor module may further include a glass cover located on the front side of the color sensor, and the concave lens may be formed by cutting a surface of the glass cover that faces the color sensor.

The color sensor module may further include a printed circuit board on which the color sensor is seated, and a flash seated on the printed circuit board so as to be adjacent to the color sensor, and the glass cover may cover both the flash and the color sensor.

A distance between a front surface of the flash and the glass cover may be shorter than a distance between a front surface of the color sensor and the glass cover.

The concave lens may be disposed so as to deviate from a center of the color sensor toward the flash.

The color sensor module may further include an anti-reflecting coating layer on one surface or both surfaces of the concave lens.

In accordance with another aspect of the present invention, a mobile terminal includes a main body, a camera mounted in the main body to obtain image information, a color sensor mounted in the main body to sense a surrounding color condition, a concave lens located on a front side of the color sensor, and a controller configured to correct the image information obtained by the camera using the color condition sensed by the color sensor.

The concave lens may have a flat surface defining the same plane as a surface of the main body.

The effects of a mobile terminal and a control method thereof according to the present invention will be described as follows.

It is possible to obtain more accurate information on color conditions by detecting the amount of light reaching a color sensor regardless of the angle of incidence of light.

In addition, by integrally forming a flash and the color sensor with each other, the number of members exposed from the rear surface of the mobile terminal may be reduced, which may improve rear surface design.

In addition, because a concave lens is realized by processing a glass cover itself, no additional member is required, thereby preventing increases in cost and in the number of processes.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
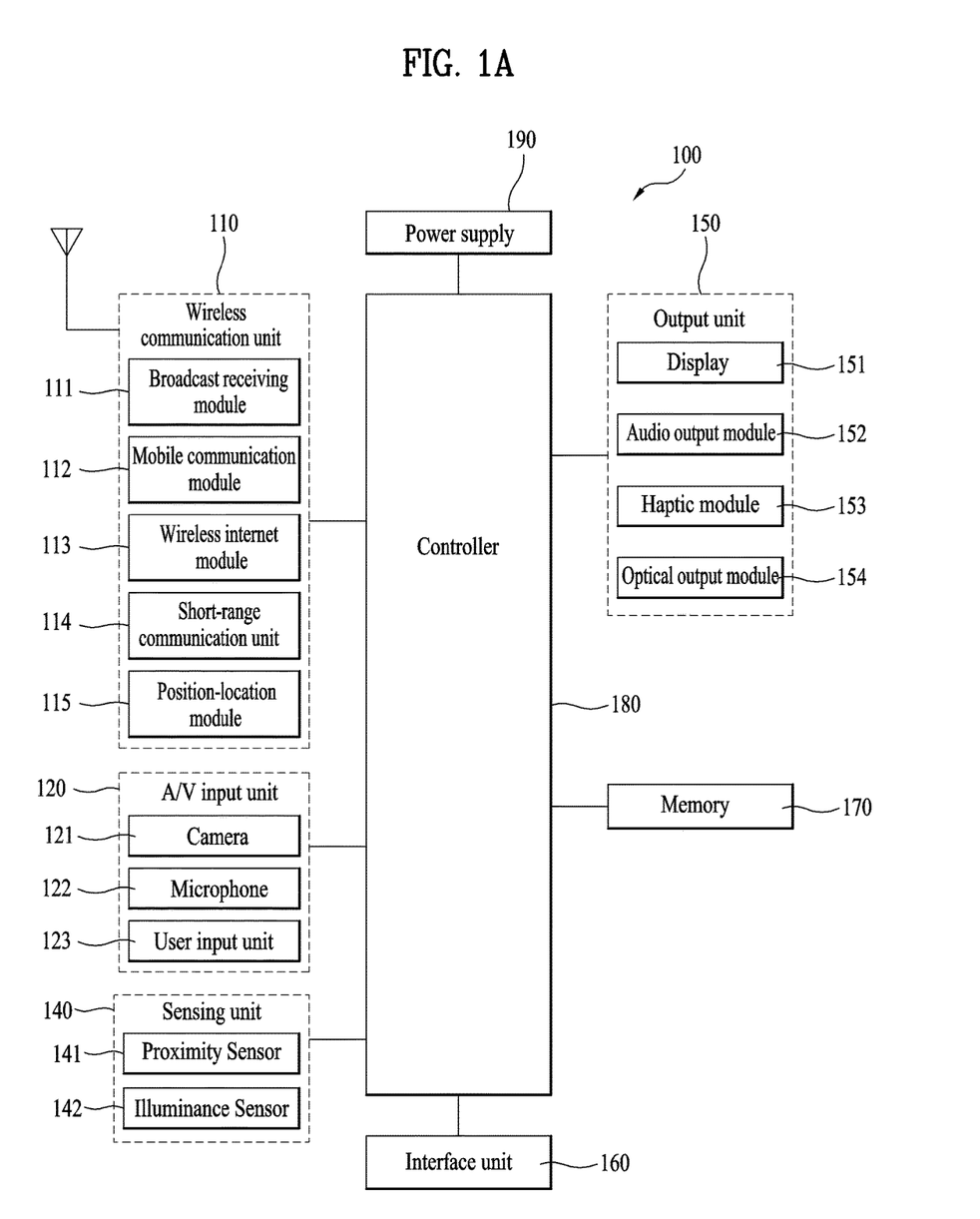
FIG. 1A is a block diagram of a mobile terminal in accordance with the present disclosure.
Figure 1B:
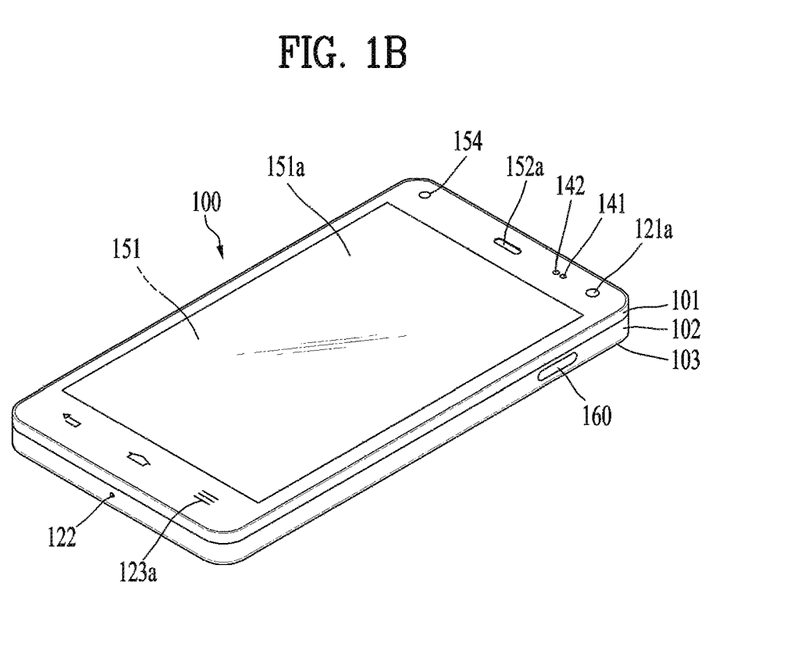
FIGS. 1B and 1C are conceptual views of one example of the mobile terminal, viewed from different directions.
Figure 1C:
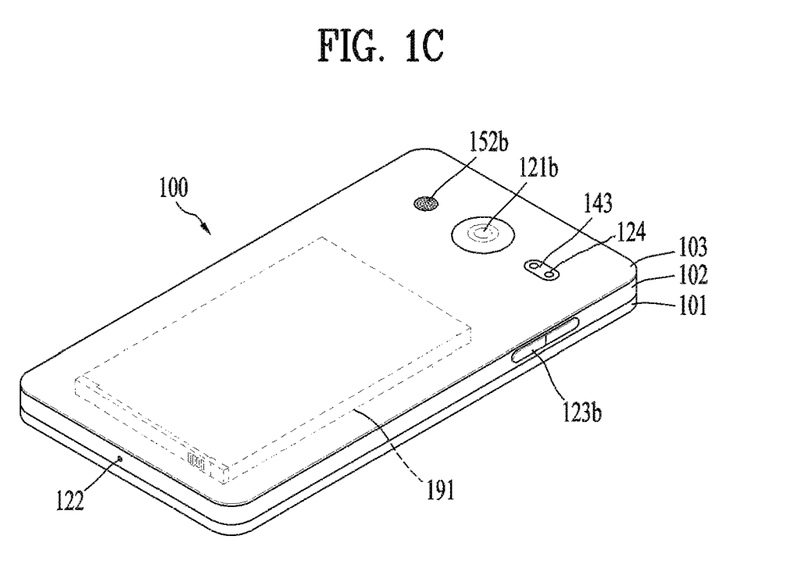

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1A is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

In addition, the controller 180 may control at least some of the components described above in the manner illustrated in FIG. 1A, in order to drive application programs stored in the memory 170. Moreover, the controller 180 may combine and operate two or more of the components included in the mobile terminal 100 in order to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include, for example, the display unit 151, first and second audio output modules 152a and 152b, the proximity sensor 141, the illumination sensor 142, the optical output module 154, first and second cameras 121a and 121b, first and second manipulation units 123a and 123b, the microphone 122, and the interface unit 160.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules

152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

In order to assist the function of the second camera 121b, the mobile terminal may further include a color sensor 143, which senses color conditions in the surrounding environment. The color sensor 143 may obtain color information and various other pieces of information regarding a surrounding or external object. The color sensor 143 may sense visible light and may additionally sense infrared light and the illumination of light, and may include an RGB channel, an IR channel and a clear channel, which transmit sensed signals to the controller.

The color sensor 143 may distinguish red, green and blue of an image sensed through the RGB channel and may transmit respective data to the controller 180. In addition, for example, the color sensor 143 may sense an infrared (IR) signal around the mobile terminal 100 through the IR channel and may transmit IR data to the controller 180. In addition, for example, the color sensor 143 may sense the amount of light around the mobile terminal 100 through the clear channel and may transmit clear data to the controller 180.

Meanwhile, the color sensor 143 may be disposed on the rear surface of the terminal body and may be disposed in the same direction as the second camera 121b. In addition, the angle of view of the color sensor 143 may be wider than the angle of view of the second camera 121b.

Although the color sensor 143 needs to be exposed from the rear surface, like the camera or the flash 124, it is necessary to minimize the number of components exposed from the rear surface, in order to maintain a tidy external appearance thereof. In order to solve this problem, the color sensor 143 may be disposed adjacent to the flash 124 so that both the flash 124 and the color sensor 143 are exposed from the rear surface through a single opening formed in the rear case.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A). may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
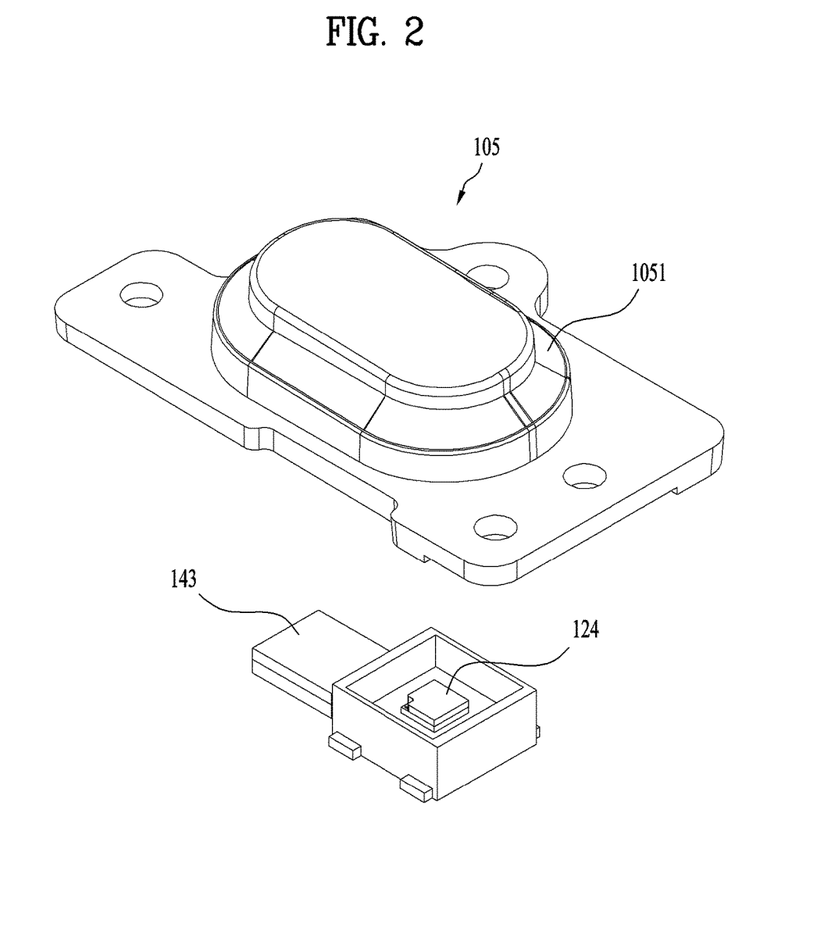
FIGS. 2 and 3 are exploded perspective views illustrating the shape of a color sensor, a flash, and a glass cover of the mobile terminal in accordance with the present invention, viewed from different directions.
Figure 3:
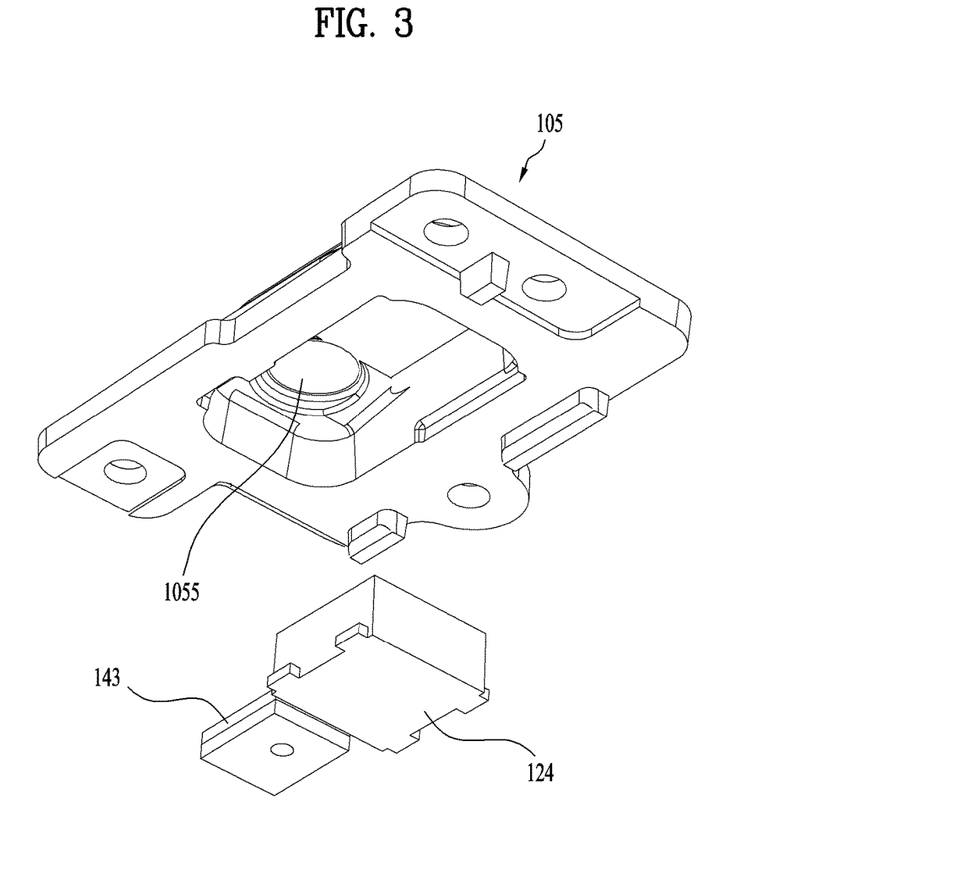
Figure 4:
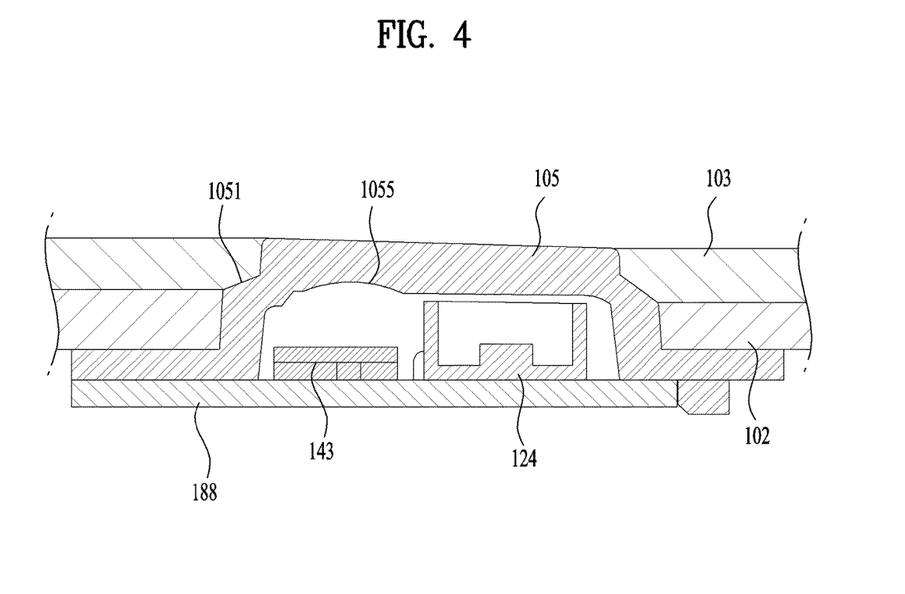
FIG. 4 is a cross-sectional view illustrating the color sensor and the flash of the mobile terminal in accordance with the present invention.

FIGS. 2 and 3 are exploded perspective views illustrating the shape of the color sensor 143, the flash 124, and a glass cover 105 of the mobile terminal in accordance with the present invention, viewed from different directions, and FIG. 4 is a cross-sectional view illustrating the color sensor 143 and the flash 124 of the mobile terminal in accordance with the present invention. For convenience of description, the direction that the color sensor 143 and the flash 124 face is referred to as the upper side, and the direction to which the color sensor and the flash are seated on a printed circuit board 188 is referred to as the lower side.

As described above, because the flash 124 and the color sensor 143 are located on the rear surface of the mobile terminal, the color sensor 143 needs to receive external light, and the flash 124 needs to emit light, an opening is formed in a position of the rear case 102 that corresponds to the flash 124 and the color sensor 143.

The flash 124 and the color sensor 143 may be formed into a single module and may be disposed side by side on the printed circuit board 188, and the flash 124 is thicker than the color sensor 143. Therefore, the upper surface of the flash 124 protrudes than the color sensor when the flash 124 and the color sensor 143 are seated on the same printed circuit board 188.

In order to protect the color sensor 143 and the flash 124, the glass cover 105 may be provided so as to cover the color sensor 143 and the flash 124. The glass cover 105 may be fitted into the opening in the rear case 102 so as to level the rear surface of the mobile terminal. FIG. 4 illustrates the case where the glass cover is coupled to the rear cover 103 as well as the rear case 102.

When the rear cover 103 is separated, the glass cover 105 protrudes from the rear case 102. Thus, in order to allow the rear cover 103 to be easily coupled or separated without interfering with the glass cover 105, the corner portion of the glass cover 105 may be curved and may be provided with an inclined portion 1051. As such, even in the state in which the rear cover 103 is separated, it is possible to prevent the glass cover 105 from appearing to protrude excessively.

The glass cover 105, as illustrated in FIG. 2, may have a cup shape to cover both the upper side and the lateral side of the color sensor 143 and the flash 124. Alternatively, the glass cover 105 may be coupled to the rear case 102 or the rear cover 103 so as to cover only the upper side of the flash 124 and the color sensor 143.

In the former case, because the glass cover 105 forms an integrated module along with the flash 124 and the color sensor 143, even if the rear case 102 or the rear cover 103 is separated, the glass cover 105 may continuously cover the flash 124 and the color sensor 143.

In consideration of the fact that the flash 124 is thicker than the color sensor 143, the position of the glass cover 105 is determined on the basis of the flash 124. As illustrated in FIG. 4, a space is defined between the color sensor 143 and the glass cover 105.

The glass cover 105 is formed of a transparent material having a refractive index higher than that of air, and therefore causes refraction of light passing therethrough. In addition, the area in which light is transmittable is limited because the size of the glass cover 105 cannot be increased indefinitely.

The flash 124 emits light outward, and the light is vertically emitted through the glass cover 105. That is, the extent of refraction of light by the glass cover 105 may be very small. The flash 124 is less affected by the glass cover 105 because the distance between the glass cover 105 and the flash 124 is not great.

On the other hand, the color sensor 143 receives light from the outside, the light may be introduced in various directions, and the amount of light that is introduced is limited by the size of the glass cover 105. The color sensor 143 is spaced apart from the glass cover 105 due to the difference in height between the color sensor 143 and the flash 124. Here, the greater the distance between the light introduction surface of the glass cover 105 and the color sensor 143, the smaller the amount of light that reaches the color sensor 143.

Figure 5:
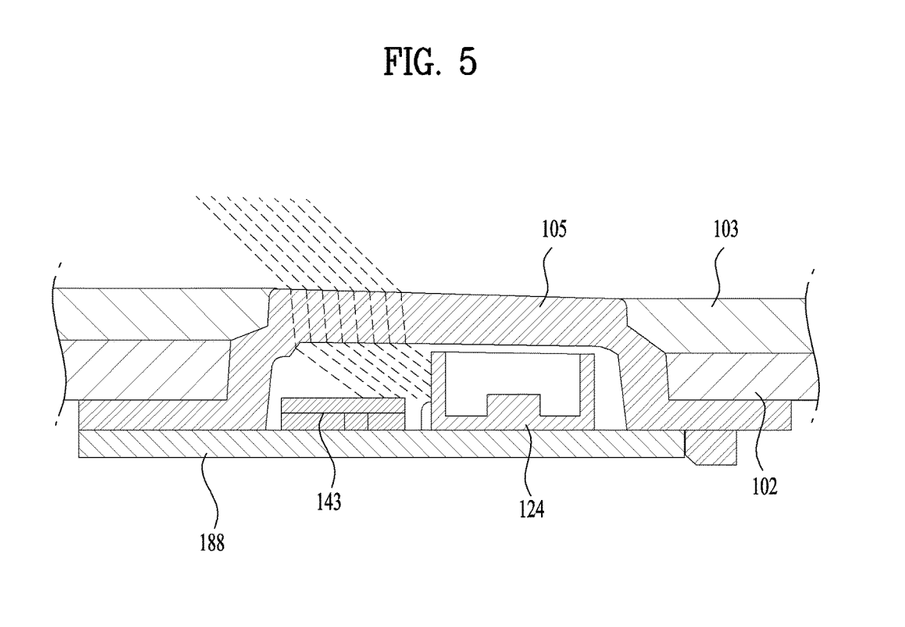
FIG. 5 is a cross-sectional view for explaining the optical path along which light reaches the color sensor when no concave lens is provided.

FIG. 5 is a cross-sectional view for explaining the optical path along which light reaches the color sensor 143 when no concave lens 1055 is provided. Most of the light coming from the front side is introduced into the color sensor 143, and the light coming from the direction in which the flash 124 is located also easily reaches the color sensor 143 because the glass cover 105 extends to the position of the flash 124.

On the other hand, the area in which the light coming from the direction in which the flash 124 is not located may be introduced is limited to the opening in the rear case 102 or the rear cover 103 because the rear case 102 or the rear cover 103 around the glass cover 105 is opaque. Therefore, as illustrated in FIG. 5, almost none of the light coming from directions in which the flash 124 is not located may reach the color sensor 143. Moreover, the color sensor 143 may correctly sense only light having an angle of incidence equal to or less than 30 degrees, and may be deteriorated in sensitivity at angles of incidence thereabove.

Figure 6:
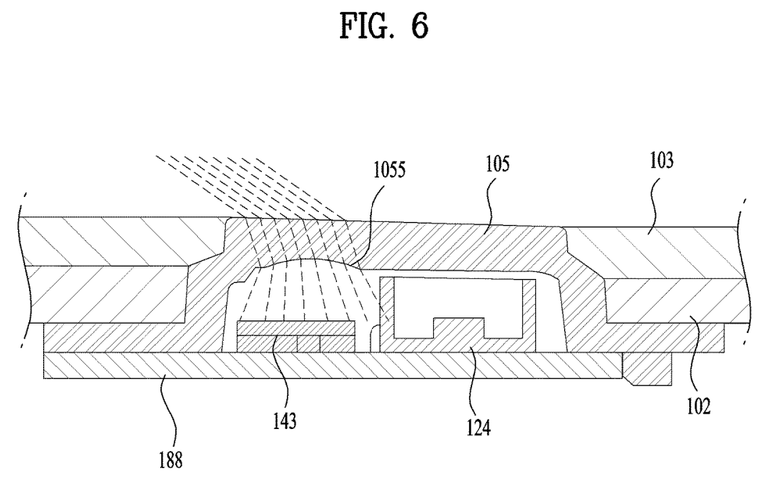
FIG. 6 is a cross-sectional view for explaining the optical path along which light reaches the color sensor of the mobile terminal in accordance with the present invention.

FIG. 6 is a cross-sectional view for explaining the optical path along which light reaches the color sensor 143 of the mobile terminal in accordance with the present invention. Even if the angle of incidence of light is large, when the concave lens 1055, which refracts light so that the angle of incidence of light reaching the color sensor 143 becomes 30 degrees or less, is provided on the upper side of the color sensor 143, deterioration in the sensitivity of the color sensor 143 may be prevented.

When using a convex lens, this is advantageous to gather light so as to achieve a required amount of light, but may cause an increase in the angle of incidence of light reaching the color sensor 143 when the light is introduced at a large angle of incidence. Therefore, when the concave lens 1055 is used, the light may diffuse to thus reach the color sensor 143, as illustrated in FIG. 6.

The concave lens 1055 may be separately prefabricated and then be located between the glass cover 105 and the color sensor 143. In order to reduce manufacturing costs, as illustrated in FIG. 6, the concave lens 1055 may be formed by processing the glass cover 105. When the exposed surface of the glass cover 105 is processed, however, the glass cover 105 may appear uneven. Therefore, the concave lens may be formed on the inner surface of the glass cover 105 above the color sensor 143. In this case, it may be unnecessary to separately manufacture the concave lens 1055, and a fixing member for fixing the concave lens 1055 may be unnecessary.

The color sensor 143 and the concave lens 1055 of the present invention may be positioned so that the centers thereof do not coincide with each other, as illustrated in FIG. 4. Because it is necessary to disperse the light coming from the direction in which the flash 124 is not located at a large angle of incidence, as illustrated in FIG. 6, the concave lens 1055 may deviate slightly toward the flash 124 so as to allow the maximum possible amount of the light coming from the direction in which the flash 124 is not located (the left side in FIG. 6) at a large angle of incidence to be supplied to the concave lens 1055.

In addition, an anti-reflecting (AR) coating layer may be formed on one surface or both surfaces of the concave lens 1055. The anti-reflecting coating layer may increase the amount of light that is introduced into the concave lens 1055 by minimizing the reflection of light from the concave lens, thereby increasing light transmittance and reducing diffuse reflection.

Figure 7:
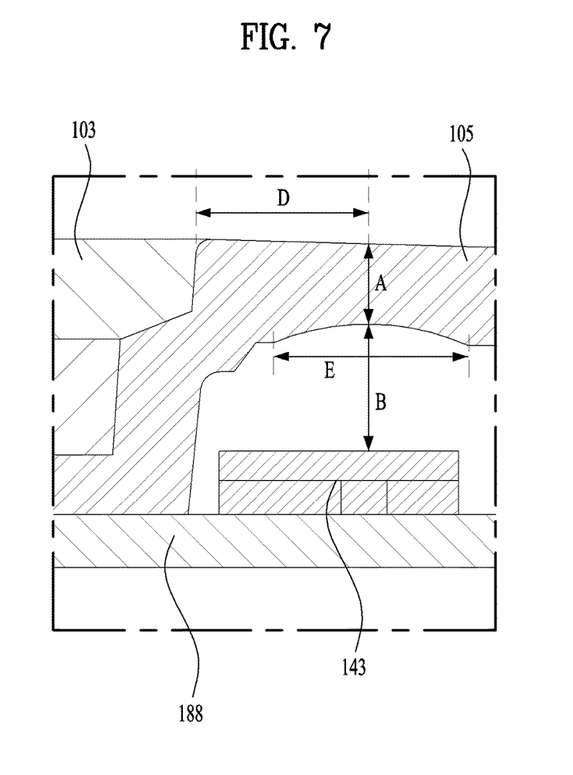
FIG. 7 is a view for explaining specifications of a concave lens of the mobile terminal in accordance with the present invention.

FIG. 7 is a view for explaining specifications of the concave lens 1055 of the mobile terminal in accordance with the present invention. Referring to FIG. 7, factors that determine the difference in the amount of light reaching the color sensor 143 of the present invention depending on the angle of incidence of light are illustrated.

First, the center thickness A of the concave lens 1055, the distance B from the color sensor 143 to the center of the concave lens 1055, the angle of view C of the glass cover 105, the radius of curvature D of the concave lens 1055, and the diameter E of the concave lens 1055 are given as important factors.

Figure 8:
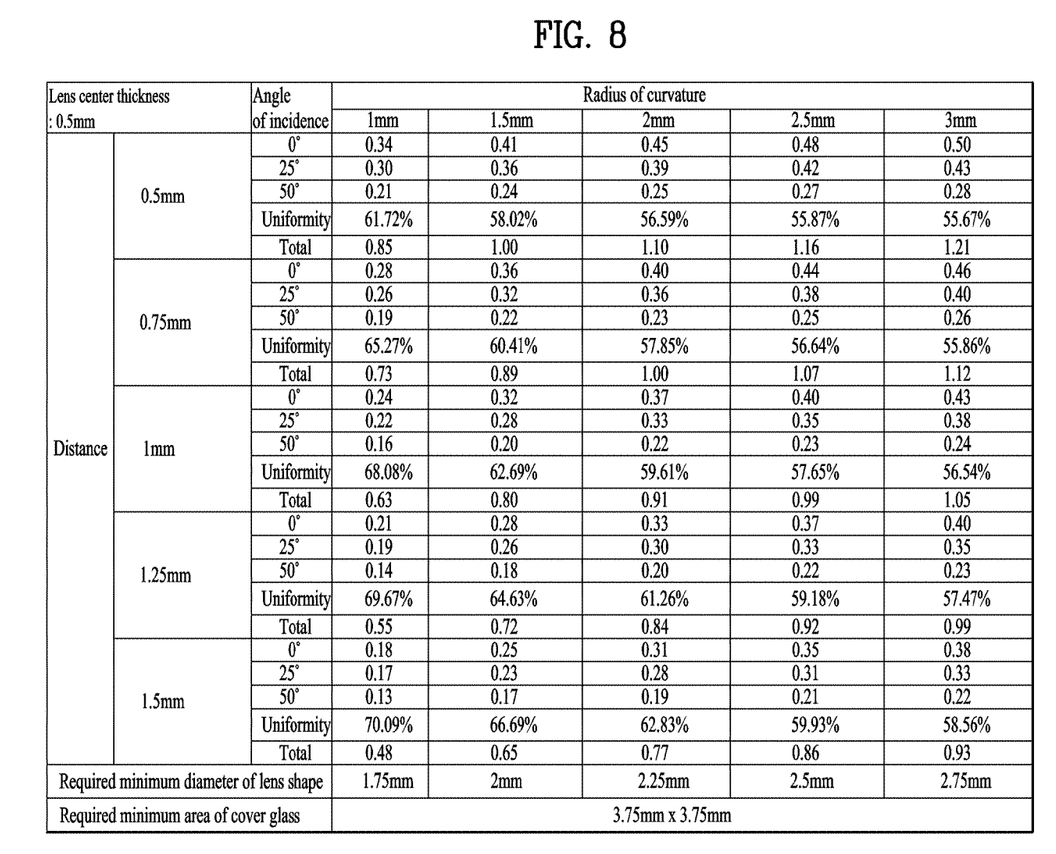
FIGS. 8 and 9 are tables illustrating uniformity and the amount of light depending on conditions in the mobile terminal of the present invention.
Figure 9:
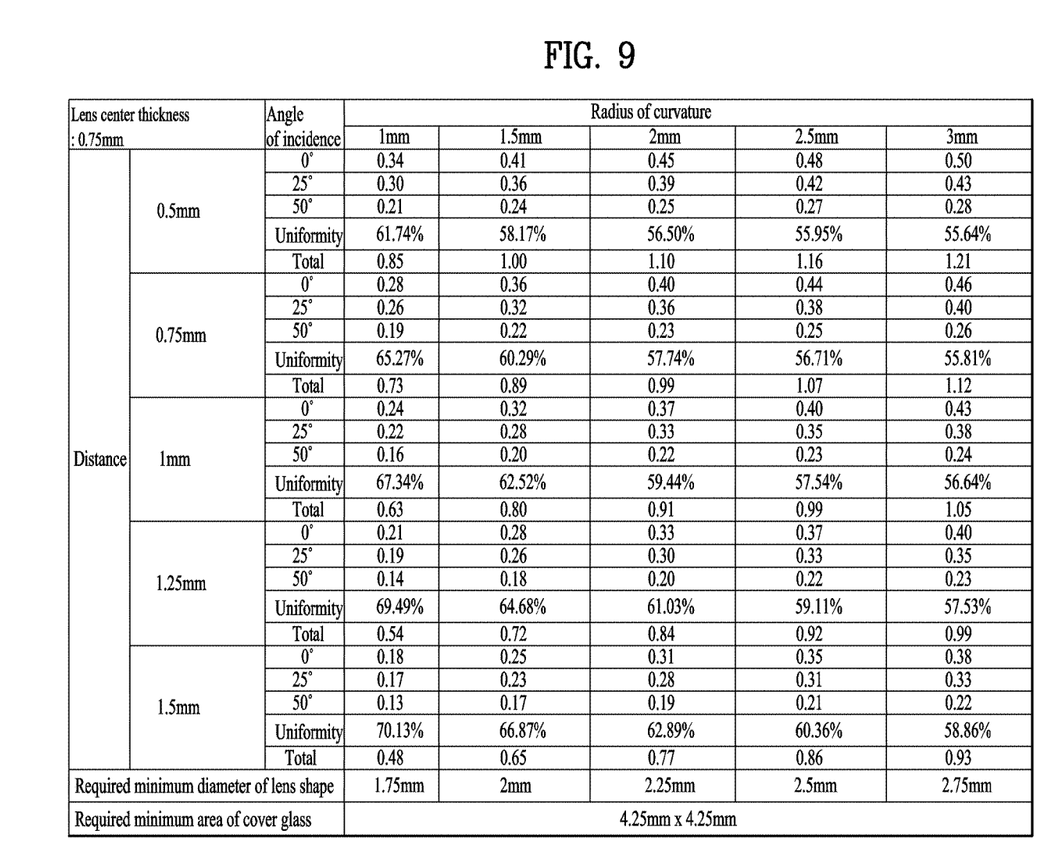

FIGS. 8 and 9 are tables illustrating uniformity and the amount of light depending on conditions in the mobile terminal of the present invention. FIG. 8 is a table showing the state where the center thickness A of the concave lens 1055 is 0.5 mm, and FIG. 9 is a table showing the state where the center thickness A of the concave lens 1055 is 0.75 mm. "Total" means the entire amount of light sensed by the color sensor 143, and the uniformity indicates the ratio of the amount of light at an angle of incidence of 50 degrees to the amount of light at an angle of incidence of zero degrees.

When the concave lens 1055 is used, as illustrated in FIGS. 8 and 9, the larger the angle of incidence of light, the smaller the amount of light reaching the color sensor 143. However, through the use of the concave lens 1055, the color sensor 143 may sense light even at an angle of incidence of 50 degrees.

For the comparison of FIGS. 8 and 9, Table 1 shows experimental results when only the glass cover 105 is used without using the concave lens 1055. The experimental results are obtained by setting the distance between the glass cover 105 and the color sensor 143 to 1.25 mm and setting the thickness of the glass cover 105 to 0.5 mm.

TABLE 1

| | |
|---|---|
| 0° | 0.62 |
| 25° | 0.56 |
| 50° | 0.00 |
| Uniformity | 0.00% |
| TOTAL | 1.17 |

When the concave lens 1055 is not used, the amount of light becomes zero at an angle of incidence of 50 degrees, and thus the uniformity becomes zero. Therefore, the color sensor 143 may sense an inaccurate surrounding color condition. In conclusion, when the concave lens 1055 is used, more accurate values may be acquired because the angle of incidence of light that may be sensed is increased, although the amount of light that is sensed is slightly reduced.

The center thickness A of the lens is obtained by subtracting the thickness of a recess, which is cut to form the concave lens 1055, from the thickness of the glass cover 105. When the distance B is short, the amount of light and the uniformity thereof are slightly increased under the condition of a thinner lens center. On the other hand, when the distance B is long, the amount of light and the uniformity thereof are slightly increased under the condition of a thicker lens center.

The distance B between the color sensor 143 and the lens center is determined by the height of the flash 124. The greater the distance B, the smaller the amount of light reaching the color sensor 143, but the greater the uniformity thereof.

The angle of view C of the glass cover 105 is determined based on the distance from the lens center to the boundary between the rear cover 103 and the glass cover 105. Although a greater amount of light may be introduced into the color sensor 143 as the angle of view C is larger, a large angle of view C increases the area of the glass cover 105 that is exposed from the rear surface of the mobile terminal, deteriorating the appearance thereof.

The amount of light reaching the color sensor 143 is reduced as the lens center thickness A and the distance B increase. Therefore, the angle of view C needs to be increased. However, in terms of design, as illustrated in FIGS. 8 and 9, the minimum diameter may be designated and the lens may be manufactured so as to be larger than the minimum diameter.

The radius of curvature D of the concave lens 1055 may range from 1 mm or more to 5 mm or less. Referring to FIGS. 8 and 9, in the present embodiment, the amount of light was measured depending on the distance B and an angle of incidence of light by setting experimental conditions such that the radius of curvature D is changed by 0.5 mm within the range from 1 mm to 3 mm.

As the radius of curvature D increases, the amount of light sensed by the color sensor 143 increases, but the uniformity thereof decreases. When the radius of curvature of the concave lens is excessively large, the extent to which the concave lens diffuses light is reduced, which may make it impossible for the concave lens to adjust the angle of incidence of light reaching the color sensor 143. When the radius of curvature of the concave lens is excessively small, the concave lens excessively diffuse light, which causes a reduction in the amount of light reaching the color sensor 143.

By storing the experimental results based on the conditions described above in a database, it is possible to realize a concave lens 1055 having an optimum radius of curvature when the distance between the color sensor 143 and the glass cover 105 is determined by the flash 124.

Accurate color condition information may be acquired when the uniformity is about 60% and the entire amount of light is 0.9 or more (about 77% or more compared to the case where the concave lens 1055 is not provided). However, as can be seen from FIGS. 8 and 9, it is necessary to select an appropriate point because the uniformity and the entire amount of light are inversely proportional to each other.

For example, when the distance between the color sensor 143 and the lens center is 1.25 mm due to the thickness of the flash 124, a concave lens 1055 having a radius of curvature of 2.5 mm may be the optimal choice for obtaining a uniformity of about 60% and the amount of light of 0.9 or more.

As described above, more accurate color condition information may be acquired by securing the amount of light reaching the color sensor 143 regardless of the angle of incidence of light.

In addition, when the color sensor is integrally formed with the flash 124, the number of members exposed from the rear surface of the mobile terminal may be reduced, which may improve rear surface design. In addition, because the concave lens 1055 is realized by processing the glass cover 105, no additional member may be necessary, which may prevent increases in costs and the number of processes.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

The invention claimed is:

1. A color sensor module comprising:
   a color sensor configured to sense a surrounding color condition;
   a glass cover located on a front side of the color sensor; and
   a concave lens formed by cutting a surface of the glass cover that faces the color sensor,
   wherein the concave lens includes a first surface that faces the color sensor and is a concave surface and a second surface that is opposite the first surface and is a flat surface.

2. The color sensor module according to claim 1, wherein the concave lens has a radius of curvature ranging from 1 mm or more to 5 mm or less.

3. The color sensor module according to claim 1, wherein a ratio of an amount of light when light introduced into the concave lens at an angle of incidence of 50 degrees reaches the color sensor to an amount of light when light introduced into the concave lens at an angle of incidence of 0 degrees reaches the color sensor is 58% or more.

4. The color sensor module according to claim 1, further comprising:
   a printed circuit board on which the color sensor is seated; and
   a flash seated on the printed circuit board so as to be adjacent to the color sensor,
   wherein the glass cover covers both the flash and the color sensor.

5. The color sensor module according to claim 4, wherein a distance between a front surface of the flash and the glass cover is shorter than a distance between a front surface of the color sensor and the glass cover.

6. The color sensor module according to claim 4, wherein the concave lens is disposed so as to deviate from a center of the color sensor toward the flash.

7. The color sensor module according to claim 1, further comprising an anti-reflecting coating layer on one surface or both surfaces of the concave lens.

8. A mobile terminal comprising:
   a main body;
   a camera mounted in the main body to obtain image information;
   a color sensor mounted in the main body to sense a surrounding color condition;
   a glass cover located on a front side of the color sensor;
   a concave lens formed by cutting a surface of the glass cover that faces the color sensor; and
   a controller configured to correct the image information obtained by the camera using the color condition sensed by the color sensor,
   wherein the concave lens includes a first surface that faces the color sensor and is a concave surface and a second surface that is opposite the first surface and is a flat surface.

9. The mobile terminal according to claim 8, wherein the concave lens has a radius of curvature ranging from 1 mm or more to 5 mm or less.

10. The mobile terminal according to claim 8, wherein a ratio of an amount of light when light introduced into the concave lens at an angle of incidence of 50 degrees reaches the color sensor to an amount of light when light introduced into the concave lens at an angle of incidence of 0 degrees reaches the color sensor is 58% or more.

11. The mobile terminal according to claim 8, further comprising:
    a printed circuit board on which the color sensor is seated; and
    a flash seated on the printed circuit board so as to be adjacent to the color sensor,
    wherein the glass cover covers both the flash and the color sensor.

12. The mobile terminal according to claim 11, wherein a distance between a front surface of the flash and the glass cover is shorter than a distance between a front surface of the color sensor and the glass cover.

13. The module terminal according to claim 11, wherein the concave lens is disposed so as to deviate from a center of the color sensor toward the flash.

14. The mobile terminal according to claim 8, wherein the concave lens has a flat surface defining the same plane as a surface of the main body.

15. The mobile terminal according to claim 8, further comprising an anti-reflecting coating layer on one surface or both surfaces of the concave lens.

* * * * *